(12) United States Patent
Shao et al.

(10) Patent No.: US 12,056,782 B2
(45) Date of Patent: *Aug. 6, 2024

(54) METHOD AND SYSTEM FOR AREA MANAGEMENT IN SMART CITY BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yong Li, Chengdu (CN); Yaqiang Quan, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,147

(22) Filed: Aug. 10, 2023

(65) Prior Publication Data

US 2023/0394611 A1 Dec. 7, 2023

Related U.S. Application Data

(63) Continuation of application No. 17/810,616, filed on Jul. 4, 2022, now Pat. No. 11,776,081.

(30) Foreign Application Priority Data

May 23, 2022 (CN) .......................... 202210559574.7

(51) Int. Cl.
*G06V 10/70* (2022.01)
*G06Q 10/04* (2023.01)
(Continued)

(52) U.S. Cl.
CPC ............. *G06Q 50/26* (2013.01); *G06Q 10/04* (2013.01); *G06V 10/70* (2022.01); *H04L 67/12* (2013.01)

(58) Field of Classification Search
CPC ........ G06Q 50/26; G06Q 10/04; G06V 10/70; H04L 67/12
See application file for complete search history.

(56) References Cited

U.S. PATENT DOCUMENTS 10,226,982 B2 3/2019 Alger et al.
11,360,236 B1 * 6/2022 Khedekar .............. G06V 20/17
(Continued)

FOREIGN PATENT DOCUMENTS

CN 106652459 A 5/2017
CN 109765337 A 5/2019
(Continued)

OTHER PUBLICATIONS

Shao, Zehua, Exploration and Research on the Structure of Internet of Things, Internet of Things Technologies Reliable Transmission, 2015, 10 pages.
(Continued)

*Primary Examiner* — Eyob Hagos
(74) *Attorney, Agent, or Firm* — METIS IP LLC

(57) ABSTRACT

The present disclosure provides a method and a system for area management in a smart city based on an Internet of Things. The method includes obtaining environmental monitoring data in a target area through a sensor network platform, the environmental monitoring data including at least one of air quality data, weather data, and satellite image data, predicting an air pollution situation in the target area through a regional prediction model based on the environmental monitoring data, the regional prediction model being a machine learning model, and sending prompt information, (Continued)

which is determined based on the air pollution situation in the target area, to a user platform through a service platform, wherein the target area is a hexagonal area; and the regional prediction model includes seven regional models and an air quality determination model; wherein a prediction mode of the regional prediction model is an iterative prediction.

14 Claims, 5 Drawing Sheets

(51) Int. Cl.
*G06Q 50/26* (2012.01)
*H04L 67/12* (2022.01)

(56) References Cited

U.S. PATENT DOCUMENTS

| | | | |
|---|---|---|---|
| 2018/0039995 A1* | 2/2018 | Choueifaty | G06Q 30/018 |
| 2018/0041606 A1* | 2/2018 | Luo | G01N 33/0027 |
| 2019/0113445 A1 | 4/2019 | Zhang et al. | |
| 2019/0279069 A1* | 9/2019 | Bastide | G16H 20/10 |
| 2021/0042648 A1 | 2/2021 | Wang et al. | |
| 2022/0092418 A1 | 3/2022 | Liu et al. | |

FOREIGN PATENT DOCUMENTS

| | | | | |
|---|---|---|---|---|
| CN | 110147383 A | | 8/2019 | |
| CN | 110361054 A | | 10/2019 | |
| CN | 110531029 A | | 12/2019 | |
| CN | 110555551 A | | 12/2019 | |
| CN | 110909483 A | | 3/2020 | |
| CN | 110909483 A | * | 3/2020 | G06F 16/29 |
| CN | 111461410 A | | 7/2020 | |
| CN | 111461410 A | * | 7/2020 | G06N 3/0454 |
| CN | 111985567 A | | 11/2020 | |
| CN | 111985567 A | * | 11/2020 | G01D 21/02 |
| CN | 113267601 A | | 8/2021 | |
| CN | 114021778 A | | 2/2022 | |
| CN | 114509539 A | * | 5/2022 | |
| CN | 114509539 A | | 5/2022 | |
| IN | 202041035301 A | | 9/2020 | |

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
White Paper on Urban Brain Development, Smart City Standard Working Group of National Beacon Commission, 2022, 59 pages.
Guan, Gong-Cou et al., Characteristic and Evaluation of Motor Vehicle Exhaust Pollution in the City, Guangzhou Chemical Industry, 35(3): 69-71, 2007.
First Office Action in Chinese Application No. 202210559574.7 mailed on Jul. 12, 2022, 17 pages.
Notification to Grant Patent Right for Invention in Chinese Application No. 202210559574.7 mailed on Aug. 2, 2022, 7 pages.

* cited by examiner

METHOD AND SYSTEM FOR AREA MANAGEMENT IN SMART CITY BASED ON INTERNET OF THINGS

CROSS-REFERENCE TO RELATED DISCLOSURES

This application is a continuation of U.S. application Ser. No. 17/810,616, filed on Jul. 4, 2022, which claims priority to Chinese Patent Application No. 202210559574.7, filed on May 23, 2022, the entire contents of each of which are hereby incorporated by reference.

TECHNICAL FIELD

The present disclosure relates to the field of Internet of Things and air quality monitoring, and in particular to methods and systems for area management in a smart city based on an Internet of Things.

BACKGROUND

With the development of society, air quality is more and more concerned by the public. There are many factors that affect air quality, such as vehicle exhaust emissions, factory exhaust emissions, dust from construction sites, excavation operations, and sandstorms. Especially in cities, the air pollution will be different in different areas. Predicting future air quality changes in an area can help regulate and coordinate motor vehicle flow in urban transportation networks. For areas with severe air pollution, it is also an important issue to investigate potential air quality pollution sources.

Therefore, it is desirable to provide a method and a system for area management in a smart city based on an Internet of Things, which can predict the air quality information in different areas and investigate potential pollution sources.

SUMMARY

One or more embodiments of the present disclosure provide a method for area management in a smart city based on an Internet of Things, and the method is executed by a management platform. The method includes: obtaining environmental monitoring data in a target area through a sensor network platform, the environmental monitoring data including at least one of air quality data, weather data, and satellite image data, predicting an air pollution situation in the target area through a regional prediction model based on the environmental monitoring data, the regional prediction model being a machine learning model, and sending prompt information, which is determined based on the air pollution situation in the target area, to a user platform through a service platform, wherein the target area is a hexagonal area, and an input of the regional prediction model includes features of the hexagonal area and other hexagonal areas adjacent to the hexagonal area; the features include time-series features of the hexagonal area and the other hexagonal areas, and the time-series features include a time feature, a traffic feature, and a meteorological feature; the regional prediction model includes seven regional models and an air quality determination model, the seven regional models respectively correspond to the hexagonal area and the other hexagonal areas adjacent to the hexagonal area, each of the seven regional models processes the time-series feature of the corresponding hexagonal area to output a corresponding time-series feature vector, and the air quality determination model processes the time-series feature vectors output by the seven regional models to determine the pollution situation of the target area; wherein a prediction mode of the regional prediction model is an iterative prediction, and the iterative prediction includes: iteratively predicting air pollution situation in the hexagonal area and the other hexagonal areas adjacent to the hexagonal area at a second time point through the regional prediction model based on air pollution situation in the hexagonal area and the other hexagonal areas adjacent to the hexagonal area at a first time point; and the regional prediction model is obtained by joint training based on training data and a label, wherein the training data includes sample time-series features of a sample hexagonal area and other sample hexagonal areas adjacent to the sample hexagonal area and sample time-series feature vectors, and the label is an actual air quality in a sample target area.

One or more embodiments of the present disclosure provide a system for area management in a smart city based on an Internet of Things, and the system includes a user platform, a service platform, a management platform, a sensor network platform, and an object platform. The sensor network platform is configured to obtain environmental monitoring data in a target area through a sensor network platform, the environmental monitoring data including at least one air quality data, weather data, and satellite image data, the management platform is configured to predict an air pollution situation in the target area through a regional prediction model based on the environmental monitoring data, the regional prediction model being a machine learning model, and the service platform is configured to send prompt information, which is determined based on the air pollution situation in the target area, to a user platform through a service platform, wherein the target area is a hexagonal area, and an input of the regional prediction model includes features of the hexagonal area and other hexagonal areas adjacent to the hexagonal area; the features include time-series features of the hexagonal area and the other hexagonal areas, and the time-series features include a time feature, a traffic feature, and a meteorological feature; the regional prediction model includes seven regional models and an air quality determination model, the seven regional models respectively correspond to the hexagonal area and the other hexagonal areas adjacent to the hexagonal area, each of the seven regional models processes the time-series feature of the corresponding hexagonal area to output a corresponding time-series feature vector, and the air quality determination model processes the time-series feature vectors output by the seven regional models to determine the pollution situation of the target area; wherein a prediction mode of the regional prediction model is an iterative prediction, and the iterative prediction includes: iteratively predicting air pollution situation in the hexagonal area and the other hexagonal areas adjacent to the hexagonal area at a second time point through the regional prediction model based on air pollution situation in the hexagonal area and the other hexagonal areas adjacent to the hexagonal area at a first time point; and the regional prediction model is obtained by joint training based on training data and a label, wherein the training data includes sample time-series features of a sample hexagonal area and other sample hexagonal areas adjacent to the sample hexagonal area and sample time-series feature vectors, and the label is an actual air quality in a sample target area.

One or more embodiments of the present disclosure provide a non-transitory computer-readable storage medium for storing computer instructions, when reading the computer instructions in the storage medium, a computer implements the above methods for predicting air quality.

BRIEF DESCRIPTION OF THE DRAWINGS

The present disclosure will be further described in the form of exemplary embodiments, and these exemplary embodiments will be described in detail with the diagrams. These embodiments are not restrictive. In these embodiments, the same number represents the same structure, wherein.

DETAILED DESCRIPTION

Figure 1:
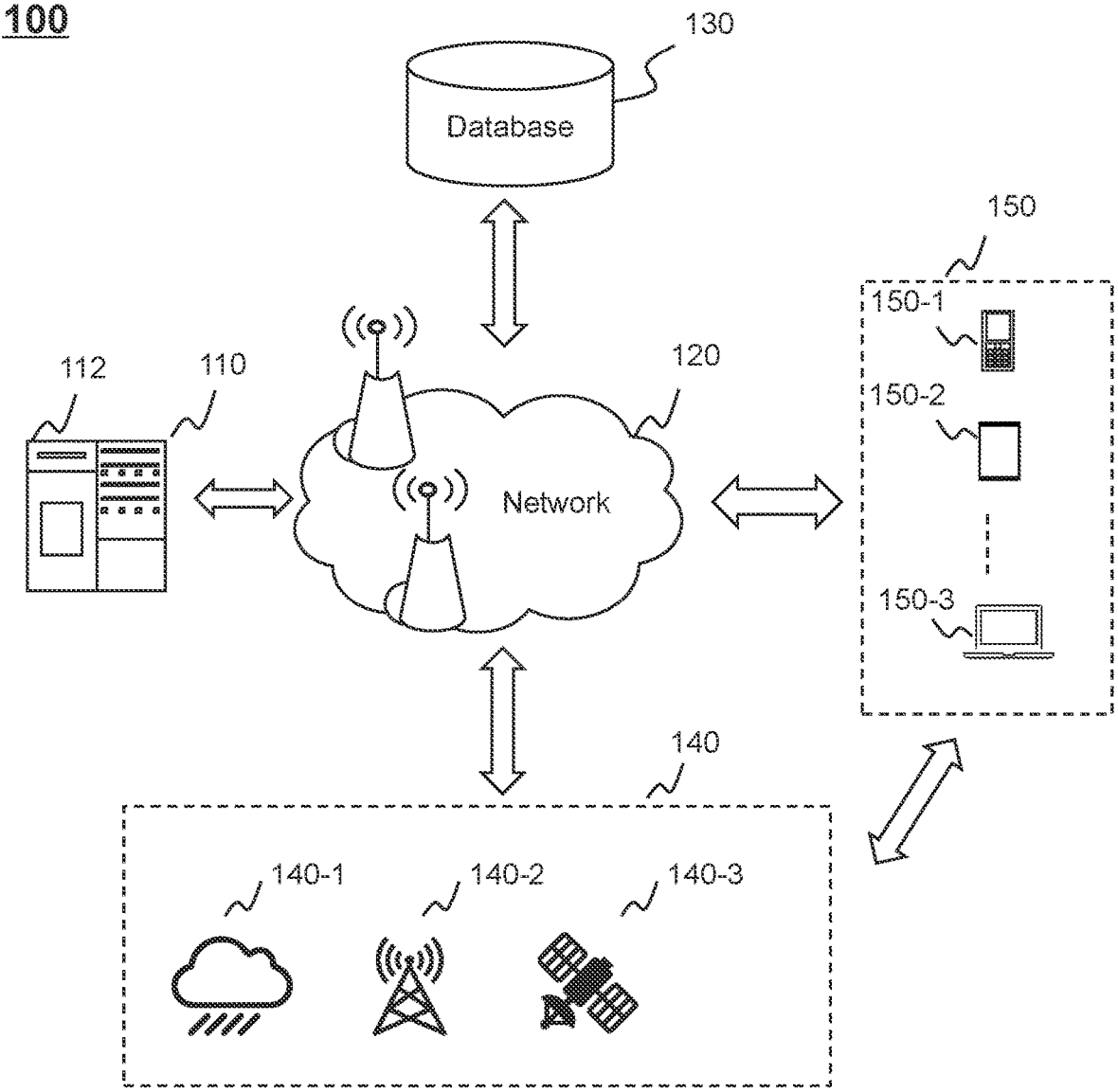
FIG. 1 illustrates a schematic diagram of an application scenario of a method for predicting air quality in a smart city according to some embodiments of the present disclosure.

In order to more clearly illustrate the technical solutions of the embodiments of the present disclosure, the following will briefly introduce the drawings that need to be used in the descriptions of the embodiments. Obviously, the drawings in the following descriptions are only some examples or embodiments of the present disclosure. For those of ordinary skill in the art, without creative work, the present disclosure can be applied to the other similar application scenarios according to these diagrams. Unless it is obvious from the language environment or otherwise stated, the same reference numbers in the drawings represent the same structure or operation.

It should be understood that the "system", "device", "unit," and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", "an" and/or "the" do not specifically refer to the singular, but also include the plural. Generally speaking, the terms "including" and "contain" only suggest that the operations and elements that have been clearly identified are included, and these operations and elements do not constitute an exclusive list, and the method or device may also include other operations or elements.

Flowcharts are used in the present disclosure to illustrate the operations performed by the system according to the embodiments of the present disclosure. It should be understood that the preceding or following operations are not necessarily performed precisely in order. Instead, the individual operations can be processed in reverse order or simultaneously. At the same time, users can also add other operations to these processes, or remove an operation or several operations from these processes.

FIG. 1 illustrates a schematic diagram of an application scenario of a method for predicting air quality in a smart city according to some embodiments of the present disclosure.

As shown in FIG. 1, the application scenario 100 of a method for predicting air quality in a smart city may include a processor 110, a network 120, a database 130, a collection terminal 140, and a user terminal 150. In some embodiments, the components in the application scenario 100 may connect and/or communicate with each other through the network 120 (e.g., a wireless connection, a wired connection, or a combination thereof). For example, the processor 110 may be connected to the database 130 through the network 120. For another example, the user terminal 150 may be connected to the processor 110 and the database 130 through the network 120.

The processor 110 may be used for processing information and/or data related to the application scenario 100, for example, predicting air quality results, generating prompt information or preferential information instructions, etc. In some embodiments, the processor 110 may include one or more processing engines (e.g., a single-chip processing engine or a multi-chip processing engine). For an example only, the processor 110 may include a central processing unit (CPU). The processor 110 may process data, information and/or processing results obtained from other devices or system components and execute program instructions based on such data, information and/or processing results to perform one or more functions described in the present disclosure.

The network 120 may connect various components of the application scenario 100 and/or connect the application scenario 100 with external resource parts. The network enables communication between the various components and between other components outside the application scenario 100 to facilitate the exchange of data and/or information. The network may be a local area network, a wide area network, the Internet, or the like, or any combination thereof. The database 130 may be used to store data and/or instructions. In some embodiments, the database 130 may store data and/or instructions that processor 110 performs or uses to accomplish the exemplary methods described in the present disclosure. In some embodiments, the database 130 may be connected to the network 120 to communicate with one or more components of application scenario 100 (e.g., the processor 110, the user terminal 150).

The collection terminal 140 may be used to collect data and/or information. For example, air quality, weather data, captured images, etc. Exemplarily, the collection terminal 140 may include a weather satellite 140-1, an air quality detection device 140-2, a land satellite 140-3, etc. In some embodiments, the collection terminal may send the collected data and/or information to the processor through the network.

The user terminal 150 may include one or more terminal devices or software. In some embodiments, the user terminal 150 may include a mobile phone 150-1, a tablet computer 150-2, a laptop computer 150-3, etc. In some embodiments, the user may view information and/or enter data and/or instructions through the user terminal. For example, the user may view the information of vehicles that often drive into a certain area through the user terminal. For another example, the user may input an instruction for sending a short message through the user terminal, send preferential information to the driver for guiding the driver to change the route, or remind the driver not to go to an area with severe air pollution.

It should be noted that the application scenario 100 is provided for illustrative purposes only and is not intended to limit the scope of this application. For those skilled in the art, various modifications or changes may be made based on the description of the present disclosure. For example, the application scenario 100 may also include information sources. However, such changes and modifications do not depart from the scope of the application.

The Internet of Things system is an information processing system that includes part or all of a user platform, a service platform, a management platform, a sensor network platform, and an object platform. The user platform is a functional platform that realizes user perception information obtention and control information generation. The service platform may realize the connection of the management platform and the user platform, which plays the functions of sensing information service communication and controlling information service communication. The management platform may realize the overall planning and coordination of the connection and cooperation between various functional platforms (e.g., the user platforms and the service platforms). The management platform gathers information about the operating system of the Internet of Things and may provide perception management and control management functions for the operating system of the Internet of Things. The service platform may realize the connection of the management platform and the object platform, which plays the functions of sensing information service communication and controlling information service communication. The user platform is a functional platform that realizes user perception information obtention and control information generation.

The processing of information in the Internet of Things system may be divided into a processing flow of user perception information and a processing flow of control information. The control information may be information generated based on user perception information. In some embodiments, the control information may include user demand control information, and the user perception information may include user query information. The processing of perception information includes obtaining the perception information and transmitting it to the management platform through the sensor network platform by the object platform. The user demand control information is transmitted from the management platform to the user platform through the service platform, thereby realizing the control of sending prompt information.

In some embodiments, when the Internet of Things system is applied to city management, it may be referred to as an Internet of Things system in the smart city.

Figure 2:
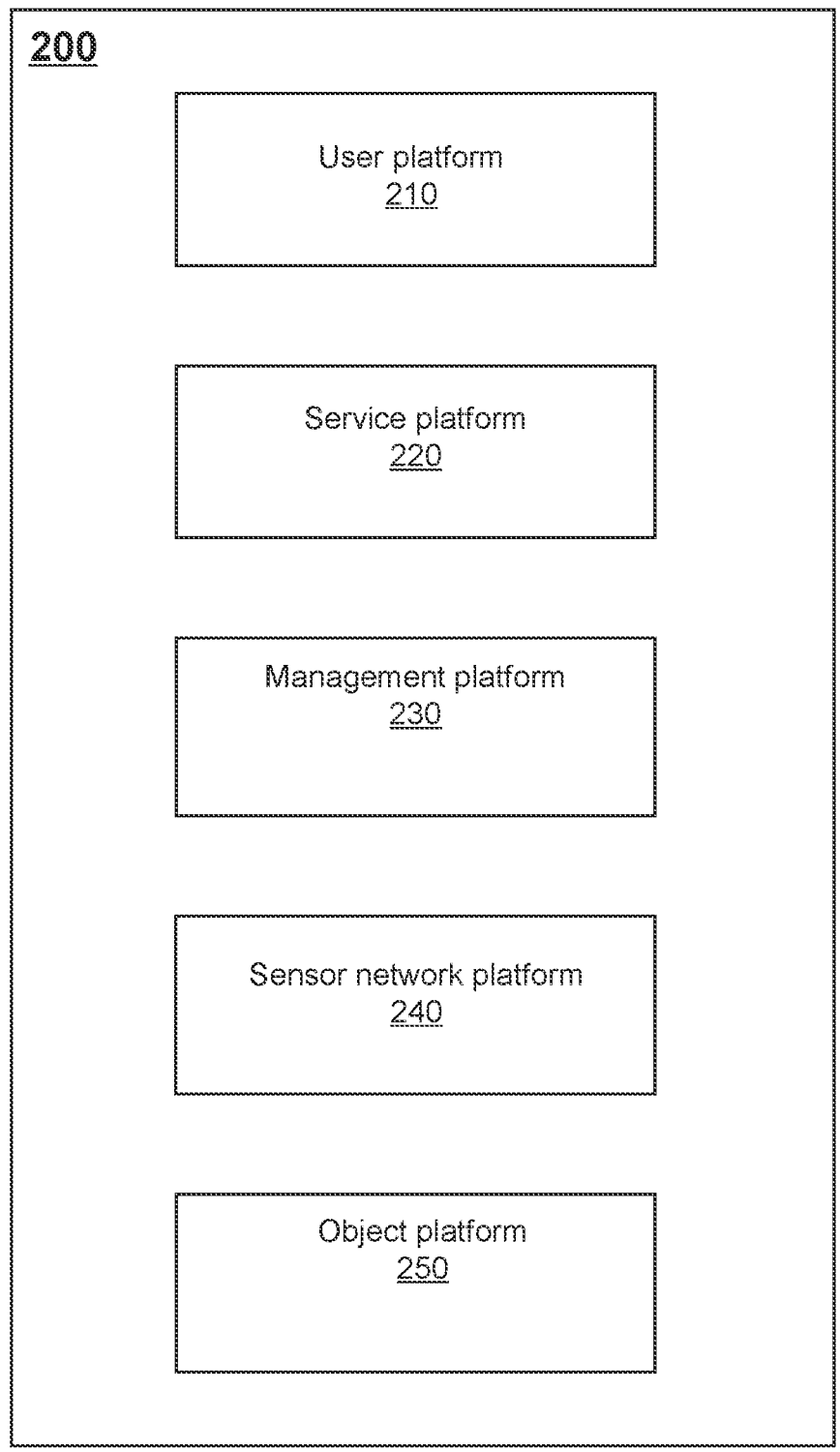
FIG. 2 illustrates a schematic diagram of a system for predicting air quality in a smart city according to some embodiments of the present disclosure.

FIG. 2 illustrates a schematic diagram of a system for predicting air quality in a smart city according to some embodiments of the present disclosure. As shown in FIG. 2, the system 200 for predicting air quality in a smart city may be implemented based on the Internet of Things system. The system 200 for predicting air quality in a smart city includes a user platform 210, a service platform 220, a management platform 230, a sensor network platform 240, and an object platform 250. In some embodiments, the system 200 for predicting air quality in a smart city may be part of the processor 110 or implemented by the processor 110.

In some embodiments, the system 200 for predicting air quality in a smart city may be applied to various scenarios of air quality prediction. In some embodiments, the system 200 for predicting air quality in a smart city may respectively obtain weather information, traffic information, or the like in various scenarios to obtain air quality prediction values in each scenario. In some embodiments, the system 200 for predicting air quality in a smart city may determine the air quality pollution source based on the obtained air quality prediction values under various scenarios.

A plurality of scenarios of air quality prediction may include predicting the air quality in target area, predicting the air quality in the adjacent area of target area, comparing the predicted air quality with the actual air quality in the area, determining suspicious area based on difference, investigating pollution sources in suspicious areas, etc. It should be noted that the above scenarios are only examples, and do not limit the specific application scenarios of the system 200 for predicting air quality in a smart city. Those skilled in the art may apply the system 200 for predicting air quality in a smart city to any other suitable scenarios on the basis of the content disclosed in the embodiment.

In some embodiments, when the system 200 for predicting air quality in a smart city is applied to the air quality prediction in a certain area, the management platform 230 obtains the area to be predicted, which may be a hexagon, and at the same time, obtains the six hexagonal areas adjacent to the target area. The management platform 230 obtains the relevant data in the area to be predicted and the six adjacent hexagonal areas, the relevant data includes meteorological data (e.g., a wind speed, a wind direction, an air pressure, a humidity, a temperature, etc.) and traffic data (e.g., a traffic flow, congestion, etc.). The relevant data may be data of a sequence at multiple historical time points (e.g., multiple time points in the past day or week at intervals of 30 minutes or one hour) up to the current time, and the relevant data is processed through a regional prediction model to predict the air quality in the target area.

In some embodiments, when the system 200 for predicting air quality in a smart city is applied to the air quality prediction in the adjacent areas of the target area, iterative prediction may be performed through a regional prediction model. The iterative prediction may predict the air quality in each area at the next time point based on the predicted data of the air quality in each area at a certain time point. For example, after predicting the air quality of each area at the first time point in the future, the relevant data at the first time point in the future will be used as the historical time point data at the second time point in the future, which is used as the input of the regional prediction model for predicting the air quality at the second time point in the future. For the air quality prediction in the target area, the pollution situation in adjacent areas is introduced for the iterative prediction, which may make the air quality prediction in the target area more accurate. Further, the six hexagonal areas may be predicted in turn and the predicted value of the air quality in the adjacent six hexagonal areas may be obtained, so as to obtain the air quality of each area in a larger range, causing that the accidental error of the data is reduced and the accuracy in the target area prediction is improved. For the relevant descriptions of air quality prediction, please refer to FIG. 5 and its related descriptions thereof.

In some embodiments, the system 200 for predicting air quality in a smart city is applied to compare the predicted air quality with the actual air quality in the area and determining the suspicious area based on the difference between the predicted air quality with the actual air quality in the area. The management platform 230 not only obtains the air quality prediction values in in the target area and the six hexagonal areas adjacent to the target area, but also obtains the air quality true values in the target area and the six hexagonal areas adjacent to the target area. The air quality true values may be obtained by the air quality detection device 140-2 installed in each area in the object platform 250 and uploaded to the management platform 230 through the sensor network platform 240. The management platform 230 obtains a difference value of air quality by comparing the air quality prediction values in each area with the corresponding air quality true values and determines a suspicious area based on the difference value. There may be additional pollution sources in the suspicious area.

In some embodiments, when the system 200 for predicting air quality in a smart city is applied to investigating pollution sources in suspicious areas, the management platform 230 obtains multiple images in the suspicious areas. The multiple images may be obtained by the land satellite 140-3 in the object platform 250 and uploaded to the management platform 230 through the sensor network platform 240. The management platform 230 may identify the multiple images through a pollution source identification model, and determine the type of the pollution source, for example, the type of the pollution source may be a vehicle source (e.g., the exhaust emission of a vehicle, and the air pollution includes the pollution of nitrogen dioxide, carbon monoxide, and PM 2.5), an industrial source (e.g., factory exhaust gas emissions, and air pollution includes sulfur dioxide pollution), a dust source (e.g., construction site dust, an excavation operation, a sandstorm, a straw burning, etc., and pollution includes particulate matter pollution), etc.

In other embodiments, when the system 200 for predicting air quality in a smart city is applied to investigating the pollution source in the suspicious area, the management platform 230 may determine the suspect point through the emission determination model in combination with other features. The other features may be air quality features including PM 2.5, PM 10, ozone, nitrogen dioxide, sulfur dioxide, carbon monoxide content, etc. in the air. The suspect point may refer to the difference between the index of the air quality and the pollution index of the air quality caused by the pollution source. For example, for the suspicious area, the investigated pollution source is straw burning, which mainly affects the PM 2.5 index. If the ozone pollution index in the air quality data in this area is high, it means that there are other pollution sources, which needs to continue to be investigated to determine the ozone pollution source.

For those skilled in the art, after understanding the principle of the system, it is possible to move the system to any other suitable scenario without departing from this principle.

The following will illustrate a specific description of the system 200 for predicting air quality in a smart city through taking the system 200 for predicting air quality in a smart city applied to the air quality prediction scenario in a certain area of the city as an example system 200 for predicting air quality in a smart city.

The user platform 210 may refer to a user-led platform, including a platform that obtains user needs and feeds back information to users. In some embodiments, the user platform is configured to input an instruction through the user terminal to query the air quality information in a certain area of the city and also query the registration information of vehicles that frequently drive into the area. In some embodiments, the user platform is configured to display the queried vehicle registration information and the owner information of the vehicle through the display terminal. In other embodiments, the user platform is configured as a user terminal to obtain prompt information or preferential information input by the user, which are sent to the target driver in the form of a short message.

The service platform 220 may refer to a platform that communicates user needs and control information, which connects the user platform 210 and the management platform 230. In some embodiments, the service platform 220 is configured to obtain instructions issued by the user through the user platform to query air quality information and vehicle registration information in a certain area of the city and feedback the vehicle registration information to the user. In some embodiments, the service platform 220 may receive information from the management platform 230, and perform data processing operations such as extraction, classification, and reprocessing of the received information to generate valuable information such as statistical data, trend data, and comparison data, and provide users with corresponding services according to the needs of users. Exemplarily, when the user queries the air quality information in a certain area, the service platform 220 obtains the air quality prediction information in the area from the management platform 230 according to the user's request instruction, summarizes the air quality information in the adjacent surrounding areas of the area, and feeds it back to the user. In some embodiments, the service platform 220 obtains the user's query instruction for suspicious air pollution sources in a certain area and obtains the investigation results of the suspicious air pollution sources from the management platform 230 to feed back to the user.

The management platform 230 may refer to a platform for predicting air quality in different areas of the city. In some embodiments, the management platform 230 may be configured to obtain an area to be predicted and an adjacent area, the area to be predicted may be a hexagon, and the adjacent area may be six adjacent hexagons. In some embodiments, the management platform 230 may be configured as a regional prediction model to predict the air quality in the area to be predicted, and the input of the regional prediction model includes the features in the hexagonal area and the six adjacent hexagonal areas.

In some embodiments, the features further include vehicle pollution data, and the method of the vehicle pollution data is obtained by operations including: obtaining road situation prediction data and vehicle registration data in the hexagonal area and other hexagonal areas adjacent to the hexagonal area, predicting the vehicle pollution data in the hexagonal area and other hexagonal areas adjacent to the hexagonal area by processing the road situation prediction data and the vehicle registration data through a vehicle pollution model.

In some embodiments, the management platform 230 may be configured to iteratively predict the air pollution situation in the hexagonal area and other hexagonal areas adjacent to the hexagonal area at a second time point through the regional prediction model based on the air pollution situation in the hexagonal area and other hexagonal areas adjacent to the hexagonal area at a first time point.

In some embodiments, the management platform 230 may be configured to obtain deviation data between the air pollution situation and an actual air pollution situation, and determine a suspicious area based on the deviation data, the suspicious area being an area that includes additional pollution sources.

In some embodiments, the management platform 230 may be configured to send prompt information, which is determined based on the air pollution situation in the target area, to a user platform through the service platform 220 includes: determining a target sub-area where the air pollution situation in the target area satisfies a preset condition, obtaining vehicle information entering the target sub-area through an object platform 250, and sending the prompt information and preferential information through the service platform 220 based on the vehicle information and the air pollution situation in the target area. In some embodiments, by sending information to vehicle owners who frequently drive into the target area, the vehicle owner is prompted to detour or change the driving route, so as to avoid further deterioration of the air quality in the area. In some embodiments, the vehicle owners are attracted by sending preferential information, such as discounts at toll stations in other areas, discounts at gas stations, etc., to divert the traffic flow on the road and alleviate the air pollution of the vehicle exhaust emissions caused by the vehicles in the target area.

The sensor network platform 240 may refer to a functional platform that manages the communication of air quality predictions in the city. In some embodiments, the sensor network platform 240 may connect the management platform 230 and the object platform 250 to implement communication functions. In some embodiments, a sensor network platform may include multiple sensor network sub-platforms. Different sensor network sub-platforms provide corresponding communication channels for different sensor devices. For example, the meteorological satellite sensor sub-platform communicates with the meteorological satellite to obtain the meteorological data of the meteorological satellite. In some embodiments, the sensor network platform 240 is divided into different sensor network sub-platforms according to the types of different collection devices, so that the sensor network platform 240 is more targeted for the obtention and processing of collected information. At the same time, multiple communication channels relieve the pressure of data uploading on the sensor network platform and improve the efficiency of system operation.

The object platform 250 may refer to a platform for obtaining external perception information through various sensor devices. For example, the object platform 250 includes an air quality monitoring device installed in a certain area of the city for obtaining the air quality information in the area and uploading it to the management platform 230 through the sensor network platform 240 to compare air quality prediction values. For another example, the object platform 250 includes meteorological satellites, which are used to obtain meteorological data in a certain area and upload it to the management platform 230 through the sensor network platform 240 to predict the air quality in the area. For another example, the object platform 250 includes a Landsat, which is used to obtain an image in a certain area and upload it to the management platform 230 through the sensor network platform 240 to investigate the suspicious air pollution sources.

It should be noted that the above descriptions of the system and its components is only for the convenience of description, and not limit the present disclosure to the scope of the illustrated embodiments. It may be understood that for those skilled in the art, after understanding the principle of the system, it is possible to arbitrarily combine the various components, or form a subsystem to connect with other components without departing from the principle. For example, each component may share a database, and each component may also have its own database. Such deformations are within the scope of protection of the present disclosure.

Figure 3:
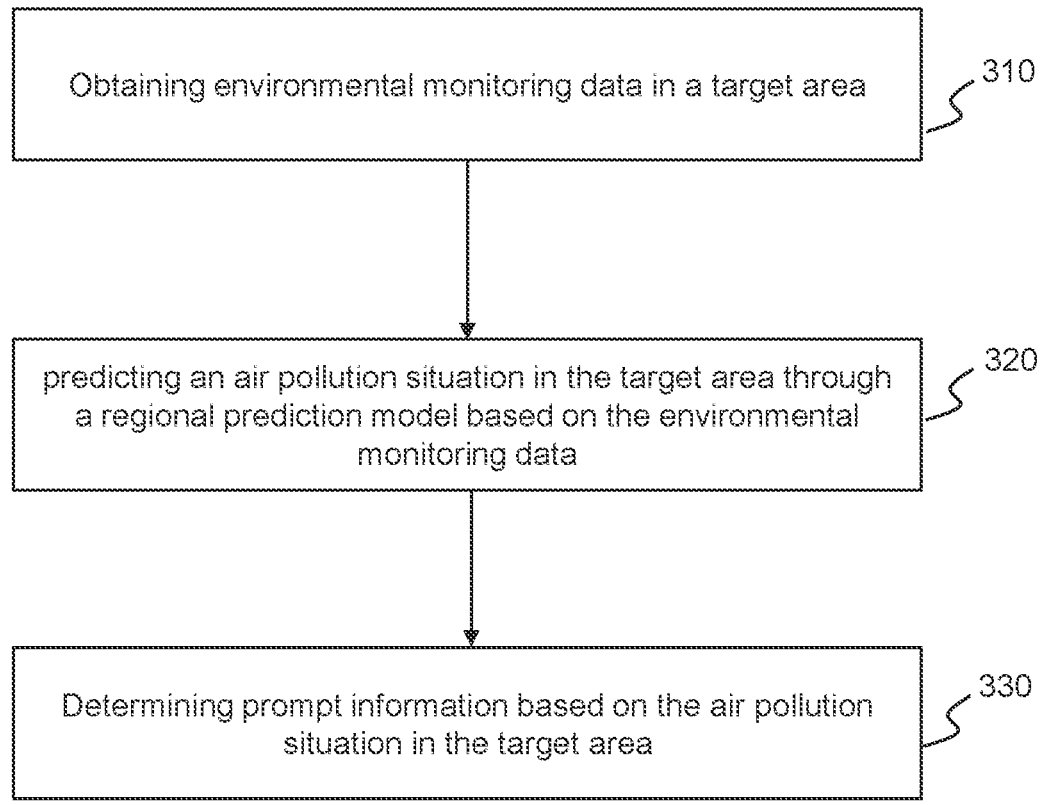
FIG. 3 illustrates an exemplary flowchart of a method for predicting air quality in a smart city according to some embodiments of the present disclosure.

FIG. 3 illustrates an exemplary flowchart of a method for predicting air quality in a smart city according to some embodiments of the present disclosure. As shown in FIG. 3, the process 300 includes the following operations. In some embodiments, the process 300 may be performed by a management platform.

In operation 310, environmental monitoring data may be obtained in a target area through a sensor network platform, and the environmental monitoring data includes at least one of air quality data, weather data, and satellite image data.

The target area may be a certain area for which air quality prediction is required. For example, the target area may be a city such as Shanghai, or a certain area of the city such as the Jing'an District. In some embodiments, the management platform may divide an area into a plurality of honeycomb-shaped hexagonal areas, and the target area may be one or more hexagonal areas. In some embodiments, the target area may be adjacent to other areas. For example, when one hexagonal area is used as the target area, the target area may be adjacent to six other hexagonal areas. In some embodiments, the target area may also have other shapes. For example, the target area may also be a rectangle, and the target area may be adjacent to eight other rectangular areas.

The environmental monitoring data may be monitored data related to the environment. For example, the environmental monitoring data may include at least one of air quality data, weather data, and satellite image data.

The air quality data may be data reflecting the air pollution degree. For example, air quality data may include air pollution index, the concentration of various pollutants (e.g., nitrogen oxides, carbon monoxide, respirable particulate matter, etc.) in the air, etc.

The weather data may be data reflecting climate and weather in a certain time and area. For example, the weather data may include temperature, humidity, precipitation, wind levels, etc.

The satellite image data may be data fed back by satellites that conduct meteorological observations on the earth. For example, the satellite image data may include image data such as satellite cloud images.

In some embodiments, the above-mentioned environmental monitoring data may be obtained through different object platforms. For example, the satellite image data may be obtained through a satellite platform, the air quality data may be obtained through an air quality monitoring platform, the weather data may be determined through a meteorological website or sensors related to the measurement of weather indicators, etc.

In operation 320, an air pollution situation in the target area may be predicted through a regional prediction model based on the environmental monitoring data, and the regional prediction model is a machine learning model.

The regional prediction model may be a model for predicting the air pollution situation in the target area. For example, the regional prediction model may be a Deep Neural Network (DNN) model, a Recurrent Neural Network (RNN) model, or the like, or any combination thereof.

The air pollution situation may be any information related to air pollution in the target area. For example, air pollution situation may include types of pollution (e.g., industrial pollution, radioactive pollution, biological pollution, etc.), pollution sources (e.g., chemical factory exhaust gas, straw combustion exhaust gas, etc.), pollution degree (e.g., urban air quality level, air pollutant content such as PM 2.5 content, etc.), or the like. In some embodiments, the air pollution situation includes actual air quality obtained by an air quality sensor.

In some embodiments, the management platform may predict the air pollution situation in the target area based on the environmental monitoring data in various ways. For example, the air pollution in the target area may be predicted based on the mapping relationship between the environmental monitoring data and the air pollution in the target area.

In some embodiments, the air pollution situation in the target area may be predicted based on a regional prediction model, and the regional prediction model may be a machine learning model.

Figure 4:
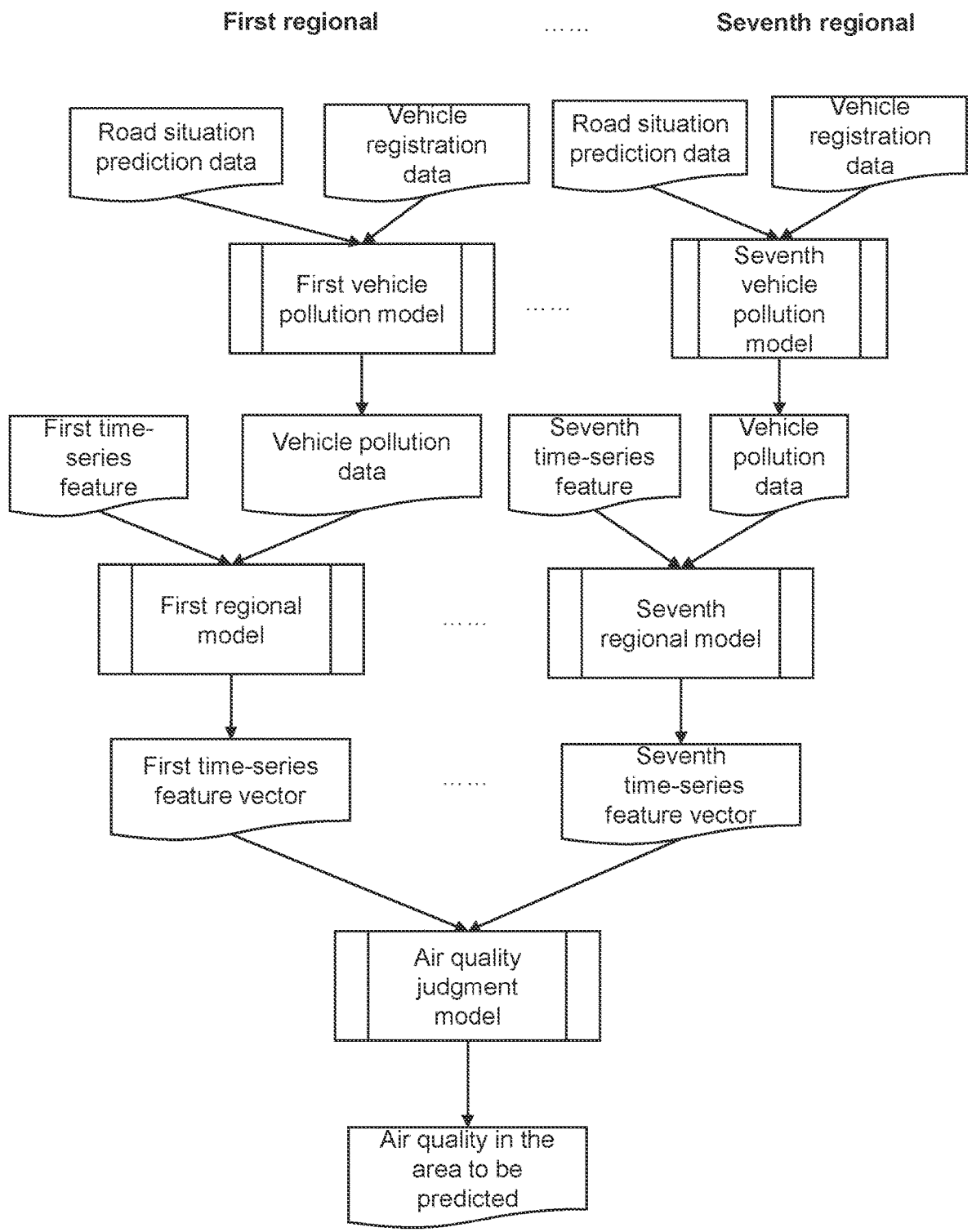
FIG. 4 illustrates an exemplary schematic diagram of a structure of a regional prediction model according to some embodiments of the present disclosure.

More descriptions about the air pollution situation in the target area predicted by the regional prediction model, please refer to FIG. 4 and the relevant descriptions.

In operation 330, prompt information, which is determined based on the air pollution situation in the target area, may be sent to a user platform through a service platform.

The prompt information may be information related to the air pollution situation in the target area. For example, the prompt information may be any form of information (e.g., text, image, voice, etc.) that reflects the pollution source, pollution type, pollution severity level, etc. in the target area. In some embodiments, the prompt information may be presented on the user terminal and sent to the user. In some embodiments, the prompt information may further include images or videos related to the pollution source, the type of the pollution source, the corresponding pollution treatment method, etc.

In some embodiments, the prompt information may be generated by preset rules, for example, the prompt information may be a preset text rule of "pollution type+pollution source+pollution severity level", such as "pollution type: biological pollution, pollution source: burning of straw in farmland, pollution severity level: severe." In some embodiments, the prompt information may also include other forms of preset rules, such as preset rules related to images, preset rules related to speech, etc. In some embodiments, the prompt information may be sent from the service platform to the user platform through the network.

The method for predicting air quality in a smart city based on the Internet of Things are described in some embodiments of the present disclosure, which may realize the air quality prediction based on the machine learning model, and the machine learning model may process the environmental monitoring data obtained by each platform and channel, improve the comprehensiveness of prediction and obtention of the air quality-related information, and improve the accuracy of results of the air quality prediction.

It should be noted that the above descriptions about the process 300 is only for example and illustration, and not limit the scope of the present disclosure. For those skilled in the art, various modifications and changes may be made to the process 300 under the guidance of the present disclosure. However, these corrections and changes are still within the scope of the present disclosure. For example, the process 300 may also include preprocessing operations.

FIG. 4 illustrates an exemplary schematic diagram of a structure of a regional prediction model according to some embodiments of the present disclosure. The structure 400 is shown in FIG. 4. In some embodiments, the structure 400 may be implemented through a management platform.

In some embodiments, the regional prediction model may include at least one regional model and one air quality judgment model, and each regional model corresponds to one area. For example, at least one regional model may be seven regional models, namely a first regional model, a second regional model, . . . , a seventh regional model, each model corresponds to one area, the seventh regional model may correspond to the target area, the first regional model, the second regional model . . . the sixth regional model may respectively correspond to other areas adjacent to the target area (that is, respectively correspond to the first area, the second area, . . . , the sixth area).

It can be understood that the descriptions of the order and quantity of each regional model in the present disclosure is intended to illustrate, and does not imply a limitation on the order, quantity, function, and corresponding areas of the regional models. For example, the first regional model may be the above-mentioned seventh regional model, the second regional model may correspond to the target area, etc. For another example, the quantity of the regional models may be determined based on the shape of the target area. For example, the shape of the area may be a rectangle, and the quantity of the regional models may be five.

The input of the regional prediction model may include the features of the target area (hexagonal area) and the features of other hexagonal areas adjacent to the target area (hexagonal area), and the output of the regional prediction model may include the area air quality in the target area.

In some embodiments, the features of the target area (hexagonal area) may be the time-series features of the target area, and the features of other hexagonal areas adjacent to the target area may be the time-series features of other hexagonal areas. The time-series features may be traffic features and meteorological features of a certain area at each time point in a period of time, that is, the time-series features may include time features, traffic features, and meteorological features. For example, 2 hours are set as a time step in a day, and a time point is obtained every 2 hours. During the time period of the day, at each time point, traffic features (e.g., traffic flow, congestion, etc.), meteorological features (e.g., wind speed, wind direction, air pressure, humidity, temperature, etc.), and the corresponding time point (i.e., time feature) as the input of the model. In some embodiments, the time-series features may include a first time-series feature, a second time-series feature, . . . , a seventh time-series feature, etc., which are used to represent corresponding time-series features in different areas.

The first regional model may be a model for extracting features of the first area. For example, the first regional model may be a deep neural network model.

The input of the first regional model may include a time-series feature, and the output may include a first time-series feature vector.

The time-series feature vector may be a vector reflecting changes in traffic and meteorological features of an area within a certain time period. For example, the elements of the vector may include a time point, and features such as traffic flow, congestion, wind speed, wind direction, air pressure, humidity, temperature, etc. at the time point.

In some embodiments, the regional prediction model may also include a second regional model, a third regional model, . . . , a seventh regional model, etc. The above regional models correspond to different areas, and the model types, input and output of the above regional models may be similar to that of the first regional model, for example, the second regional model may be a deep neural network model, the input of the second regional model may include time-series features, and the output may include second time-series feature vectors. To sum up, the time-series feature vectors corresponding to the above seven areas may be obtained through the above seven regional models. Each time-series feature vector may reflect various features of the corresponding area, and the seventh time-series feature vector may correspond to the target area.

The air quality judgment model may be a model for confirming air pollution situations. For example, the air quality judgment model may be a deep neural network model, etc.

The input of the air quality judgment model may include the above-mentioned first time-series feature vector, the second time-series feature vector, . . . , the seventh time-series feature vector, and the output of the air quality judgment model may include the air pollution situation in the target area.

In some embodiments, the regional prediction model may be obtained through joint training. For example, training sample data is input into the first regional model, the second regional model, . . . , the seventh regional model, and the training sample data is the time-series feature of the corresponding area, and the output first time-series feature vector, second time-series feature vector, . . . , the seventh time-series feature vector are obtained. Then, the above time-series feature vector used as the training sample data of the air quality judgment model are input into the air quality judgment model to obtain the air pollution situation in the target area, and the air pollution situation in the sample target area is used to verify the output of the air quality judgment model. For example, verification may be performed based on the actual air quality obtained by the air quality detection device installed in the target area as the label of the air quality judgment model.

For another example, the training sample data includes the time-series feature and the time-series feature vector of the corresponding area, the training sample data is input into the first regional model, the second regional model, . . . , the seventh regional model, and the sample time-series feature vector is input into the air quality judgment model, the outputs of the first regional model, the second regional model, . . . , the seventh regional model are used as the input of the air quality judgment model, and the label is the air pollution situation in the target area. In some embodiments, the training labels may be the actual air quality obtained by the air quality sensor. During the training process, a loss function is established to update the parameters of the model based on the air pollution in the target area and the outputs of the first regional model, the second regional model, . . . , and the seventh regional model.

In some embodiments, the training sample data may include at least time-series features of different areas. The labels may be the air pollution situation in the target area. The labels may be obtained manually.

In some embodiments, the input of the regional prediction model may also include vehicle pollution data (also referred to as vehicle pollution features). In some embodiments, obtaining the vehicle pollution data includes: obtaining road situation prediction data and vehicle registration data in the hexagonal area and other hexagonal areas adjacent to the hexagonal area, and predicting the vehicle pollution data in the hexagonal area and other hexagonal areas adjacent to the hexagonal area by processing the road situation prediction data and the vehicle registration data through a vehicle pollution model.

The vehicle pollution data may be data of air pollution caused by vehicles in an area within a certain period of time. For example, the vehicle pollution data may include vehicle exhaust emission scale, vehicle exhaust emission composition, vehicle exhaust emission distribution, etc. In some embodiments, the vehicle pollution data may be determined by a vehicle pollution model. In some embodiments, some or all of the vehicle pollution data may belong to time-series features.

The vehicle pollution model may be a model that determines vehicle pollution data. For example, the vehicle pollution model may be a deep neural network model, etc. In some embodiments, the vehicle pollution model may include a first vehicle pollution model, a second vehicle pollution model, . . . , a seventh vehicle pollution model, etc., which are used to represent models corresponding to vehicle pollution data in different areas, all of which belong to the same parameters model of vehicle pollution.

The input of the vehicle pollution model may include road situation prediction data and vehicle registration data, and the output of the vehicle pollution model may include vehicle pollution data. In some embodiments, the output vehicle pollution data may be represented by air quality data, so the vehicle pollution data may also be understood as air quality data under conditions corresponding to the input road situation prediction data and vehicle registration data.

The road situation prediction data may be statistical data of road situation data within a certain period of time in history. For example, the road situation prediction data may include the count of vehicles on the road, the degree of road congestion, etc. The road traffic data includes features such as exhaust emissions.

The vehicle registration data may be vehicle-related information within a certain period of time in history. For example, the vehicle registration data may include the vehicle's power type (e.g., fuel, electric, etc.), exhaust emissions, fuel consumption, etc.

In some embodiments, the vehicle pollution model may be a DNN whose input may be road traffic data and the output may be air quality data (representing vehicle pollution data). The road traffic data includes features such as road traffic flow, the proportion of fuel vehicles, exhaust emissions, etc.

In some embodiments, the vehicle pollution model may be obtained through joint training with the regional prediction model. For example, training sample data is input into the vehicle pollution model to obtain the output historical vehicle pollution data, the training sample data being historical road situation prediction data and historical vehicle registration data, then the above historical vehicle pollution data used as the training sample data of the regional prediction model is input into the regional prediction model to obtain the air pollution situation in the target area, and the output of the regional prediction model is verified by using the air pollution situation in the sample target area. Using the back-propagation features of the neural network model, the validation data of the vehicle pollution data output by the vehicle pollution model is obtained, and the validation data is used as a label to train the vehicle pollution model.

For another example, the training sample data includes historical road situation prediction data, historical vehicle registration data, and historical vehicle pollution data, the training sample data is input into the vehicle pollution model, the sample historical vehicle pollution data is input into the regional prediction model, and the output of the vehicle pollution model is used as the input of the regional prediction model, and the label is the air pollution situation in the target area. During the training process, a loss function is established based on the air pollution in the target area and the output of the vehicle pollution model to update the parameters of the model.

In some embodiments, the training sample data may at least include historical road situation prediction data and historical vehicle registration data. The label may be the air pollution situation in the target area. The label may be obtained by manual annotation or determined based on the monitoring of corresponding road sensors such as air quality sensors.

In some embodiments, the prediction approach of the regional prediction model may be iterative prediction, and the iterative prediction includes: iteratively predicting the air pollution situation in the hexagonal area and other hexagonal areas adjacent to the hexagonal area at a second time point through the regional prediction model based on air pollution situation in the hexagonal area and other hexagonal areas adjacent to the hexagonal area at a first time point.

The first time point may be the time point at which the air pollution situation prediction is initially performed within a certain time period. The second time point may be the time point at which the air pollution situation prediction is performed again within a certain time period. For example, the first time point may be expressed as a specific time such as 9:00, or a specific day, and the second time point may also be expressed similarly.

In some embodiments, the iterative prediction may obtain the air pollution situation and the time-series features corresponding to the first time point from the prediction process at the first time point and use the air pollution situation and the time-series features corresponding to the first time point as the input of the prediction process at the second time point. In some embodiments, the prediction process may further include a third time point, a fourth time point, . . . , etc. More descriptions about the prediction processes at the above time points, please refer to the prediction processes at the first time point and the second time point.

In some embodiments, the condition of the iterative termination may be that the count of time points reaches a preset count of time points. For example, the preset count of time points is five, when the prediction process is the fifth time point, the iterative prediction stopped when the prediction corresponding to the time point ends.

The prediction of the air pollution situation in the future may be realized through the regional prediction model described in some embodiments of the present disclosure, the impact of vehicle exhaust on the air instructions is considered by introducing the statistical data of vehicles in the area. In addition, the model is obtained through joint training, which may reduce the training samples, simplify the training process, and avoid the problem that the labels of each regional model are difficult to obtain.

Figure 5:
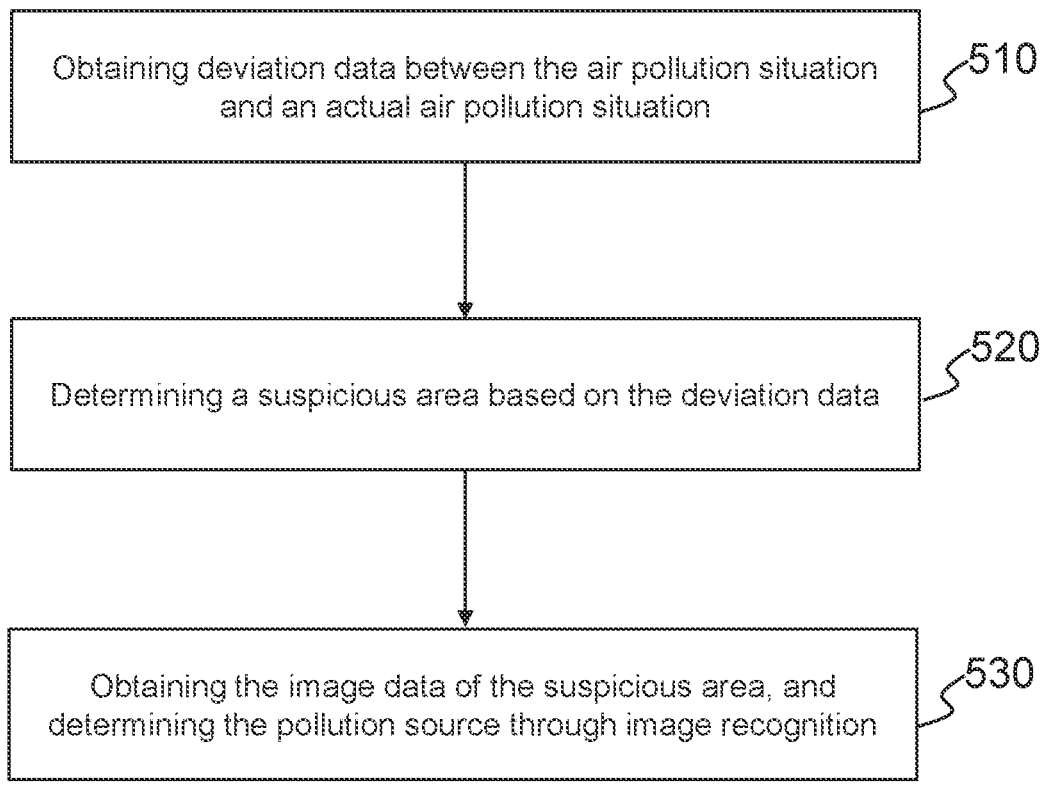
FIG. 5 illustrates an exemplary flowchart for determining a suspicious area according to some embodiments of the present disclosure.

FIG. 5 illustrates an exemplary flowchart for determining a suspicious area according to some embodiments of the present disclosure. As shown in FIG. 5, the process 500 includes the following operations. In some embodiments, the process 500 may be performed by a management platform.

In operation 510, deviation data may be obtained between the air pollution situation and an actual air pollution situation.

The deviation data may be data reflecting that the predicted air pollution situation is different from the actual situation. For example, the deviation data may include that the PM 2.5 content in the predicted time period deviates greatly from the actual PM 2.5 content in the time period, and the degree of deviation exceeds the deviation threshold. The deviation data may also include that the pollution type in the predicted time period is biological pollution, and the pollution types of the actual air pollution situation in the time period are biological pollution and industrial pollution.

In some embodiments, the deviation data may be obtained by comparing the predicted air pollution situation with the actual air pollution situation through the management platform, and the actual air pollution situation may be obtained through an air quality detection device or manual input.

In operation 520, a suspicious area may be determined based on the deviation data.

The suspicious areas may be areas where other pollution sources may be present. For example, the suspicious area may be one or more of the above-mentioned hexagonal areas, and the suspicious area may also be a specific address, such as a factory.

In some embodiments, the suspicious areas may be determined from environmental monitoring data. For example, the area where the haze concentration reaches the threshold of the haze concentration is determined by satellite image data as the suspicious area, or the area where the dust concentration in the air in the sensor detection area reaches the dust concentration threshold is regarded as the suspicious area. In some embodiments, the suspicious area may be determined from vehicle-related data such as vehicle pollution data, road situation prediction data, etc. For example, through the distribution of the road network where vehicles travel, areas with high vehicle density are determined as suspicious areas. In some embodiments, the suspicious areas may also be determined by manual discrimination.

In operation 530, the image data of the suspicious area may be obtained, and the pollution source may be determined through image recognition.

In some embodiments, the management platform may extract image features from the image data and combine other features to determine the pollution source through an emission determination model.

The pollution source identification model may be a model for judging the type of pollution source. For example, the pollution source identification model may be a convolutional neural network model, a deep neural network model, or the like, or any combination thereof.

In some embodiments, the pollution source identification model may include an image feature extraction layer and a judgment layer.

The image feature extraction layer may be a model for extracting features related to pollution sources in an image. For example, the image feature extraction layer may be a convolutional neural network model.

The input of the image feature extraction layer may include image data of suspicious areas, and the output of the image feature extraction layer may include an image feature vector. The image feature vector may be a vector reflecting the features contained in the image. For example, elements of the image feature vector may include exhaust emission features of pollution sources, building features, scale features, etc.

The judgment layer may be a model for finally obtaining the types of pollution sources. For example, the decision layer may be a deep neural network model.

The input of the judgment layer may include image feature vectors, and air quality data, and the output of the judgment layer may include the type of pollution source. The types of the pollution source may be a vehicle source (e.g., the exhaust emission of a vehicle, and the air pollution including the pollution of nitrogen dioxide, carbon monoxide, and PM 2.5), a dust source (e.g., construction site dust, an excavation operation, a sandstorm, a straw burning, etc., pollution including PM 2.5 and PM 10), an industrial source (e.g., factory exhaust gas emissions, air pollution including sulfur dioxide pollution), etc.

In some embodiments, the pollution source identification model may be obtained through joint training of the image feature extraction layer and the judgment layer. For example, training sample data is input into the image feature extraction layer to obtain the output historical image feature vector, the training sample data being historical image data, then the above historical image feature vector and the historical air quality data used as the training sample data of the judgment layer is input into the judgment layer to obtain the type of the pollution source, and the output of the judgment layer is verified by the type of the sample pollution source. The verification data of the historical image feature vector output by the image feature extraction layer is obtained by using the back-propagation features of the neural network model, and the verification data is used as the label to train the image feature extraction layer.

For another example, the training sample data includes historical image data, historical image feature vector, and historical air quality data. The training sample data is input image feature extraction layer, sample historical image feature vector and historical air quality data are input judgment layer and the output of the feature extraction layer is used as the input of the judgment layer, and the label is the type of pollution source. During the training process, a loss function is established based on the type of pollution source and the output of the image feature extraction layer to update the parameters of the model.

In some embodiments, the training sample data may include at least historical image data and historical air quality data. The labels may be types of pollution sources. The labels may be obtained by manual annotation or determined based on the actual types of pollution sources.

In some embodiments of the present disclosure, the suspicious area is determined based on the deviation data between the air pollution situation and the actual air pollution situation, the image data of the suspicious area is identified by the image to determine the pollution sources, and the emission determination model is combined with other features to determine the pollution source, which is beneficial to accurately, objectively, intelligently, and efficiently determine the areas with additional pollution sources and avoid the threat of potential pollution sources.

It should be noted that the above description about the process 500 is only for example and illustration, and not limit the scope of application of the present disclosure. For those skilled in the art, various modifications and changes can be made to the process 500 under the guidance of the present disclosure. However, these corrections and changes are still within the scope of the present disclosure. For example, the process 500 may also include preprocessing operations.

Some embodiments of the present disclosure also disclose a non-transitory computer-readable storage medium for storing computer instructions, when reading the computer instructions in the storage medium, a computer implements the above-mentioned method for predicting air quality in a smart city based on the Internet of Things.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, which are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures or features may be combined as suitable in one or more embodiments of the present disclosure.

Additionally, the order in which elements and sequences of the processes described herein are processed, the use of alphanumeric characters, or the use of other designations, is not intended to limit the order of the processes and methods described herein, unless explicitly claimed. While various presently contemplated embodiments of the invention have been discussed in the foregoing disclosure by way of example, it is to be understood that such detail is solely for that purpose and that the appended claims are not limited to the disclosed embodiments, but, on the contrary, are intended to cover all modifications and equivalent arrangements that are within the spirit and scope of the embodiments herein. For example, although the system components described above may be implemented by hardware devices, they may also be implemented by software-only solutions, such as installing the described system on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

For each patent, patent present disclosure, patent present disclosure publications and other materials referenced in the present disclosure, such as articles, books, instructions, publications, documents, etc., here, all of them will be incorporated herein by reference. Except for the present disclosure history documentation of the present disclosure or the conflict, there is also an except for documents (current or after the present disclosure), which are available in the present disclosure. It should be noted that, if there is any inconsistency or conflict between the descriptions, definitions and/or use of terms in the accompanying materials of the specification and the contents of the specification, the descriptions, definitions and/or use of terms in this specification shall prevail.

Finally, it should be understood that the embodiments described in the present disclosure are intended to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A method for area management in a smart city based on an Internet of Things system, wherein the Internet of Things system includes a user platform, a service platform, a management platform, a sensor network platform, and an object platform, which are connected in sequence, wherein the user platform includes a terminal device, the service platform includes a first server, the management platform includes a second server, the sensor network platform includes a communication network and a gateway, the object platform includes a weather satellite, an air quality detection device, and a land satellite, wherein the method is executed by the management platform, and the method comprises:

obtaining environmental monitoring data in a target area based on the object platform and uploading the environmental monitoring data to the management platform through the sensor network platform, wherein the environmental monitoring data includes at least one of air quality data, weather data, and satellite image data;

obtaining deviation data between air pollution situation and an actual air pollution situation based on the object platform and uploading the deviation data to management platform through the sensor network platform;

determining a suspicious area based on the deviation data, wherein the suspicious area is an area that includes additional pollution sources;

obtaining image data of the suspicious area based on the object platform and uploading the image data of the suspicious area to management platform through the sensor network platform;

processing the image data of the suspicious area by a pollution source identification model to determine a pollution source and sending the pollution source to the user platform through the service platform, wherein the pollution source identification model includes an image feature extraction layer and a judgment layer, the image feature extraction layer is used to extract an image feature vector of the suspicious area based on the image data of the suspicious area, and the judgment layer is used to determine the pollution source based on the image feature vector of the suspicious area and an air quality feature;

predicting an air pollution situation in the target area through a regional prediction model based on the environmental monitoring data, wherein the regional prediction model is Neural Network model; and sending prompt information, which is determined based on the air pollution situation in the target area, to the user platform through the service platform for prompting a vehicle owner to detour or change a driving route, wherein the target area is a hexagonal area, and an input of the regional prediction model includes features of the hexagonal area and other hexagonal areas adjacent to the hexagonal area; the features include time-series features of the hexagonal area and the other hexagonal areas, and the time-series features include a time feature, a traffic feature, and a meteorological feature;

wherein a prediction mode of the regional prediction model is an iterative prediction, and the iterative prediction includes:

iteratively predicting air pollution situation in the hexagonal area and the other hexagonal areas adjacent to the hexagonal area at a second time point through the regional prediction model based on air pollution situation in the hexagonal area and the other hexagonal areas adjacent to the hexagonal area at a first time point; and the regional prediction model is obtained by joint training based on training data and a label, wherein the training data includes sample time-series features of a sample hexagonal area and other sample hexagonal areas adjacent to the sample hexagonal area and sample time-series feature vectors, and the label is an actual air quality in a sample target area.

2. The method according to claim 1, wherein the sensor network platform is composed of at least one sensor sub-platform, and the sensor network platform is configured to:

respectively obtaining sensing data collected by different types of sensor devices configured on the object platform through the at least one sensor sub-platform, wherein the sensing data is used as one of components of the environmental monitoring data; and uploading the sensing data to the management platform after summarizing and processing.

3. The method according to claim 1, wherein the input of the regional prediction model further includes vehicle pollution data, and the vehicle pollution data is obtained by operations including:

obtaining road situation prediction data and vehicle registration data in the hexagonal area and other hexagonal areas adjacent to the hexagonal area; and predicting the vehicle pollution data in the hexagonal area and other hexagonal areas adjacent to the hexagonal area by processing the road situation prediction data and the vehicle registration data through a vehicle pollution model.

4. The method according to claim 1, wherein the sending prompt information, which is determined based on the air pollution situation in the target area, to the user platform through the service platform includes:

determining a target sub-area where the air pollution situation in the target area satisfies a preset condition;

obtaining vehicle information entering the target sub-area through the object platform; and sending the prompt information and preferential information through the service platform based on the vehicle information and the air pollution situation in the target area.

5. The method according to claim 1, wherein the regional prediction model includes seven regional models and an air quality determination model, the seven regional models respectively correspond to the hexagonal area and the other hexagonal areas adjacent to the hexagonal area, each of the seven regional models processes the time-series feature of the corresponding hexagonal area to output a corresponding time-series feature vector, and the air quality determination model processes the time-series feature vectors output by the seven regional models to determine the air pollution situation of the target area.

6. The method according to claim 5, wherein the traffic features include a vehicle flow and a congestion situation at each time point during a day.

7. The method according to claim 5, wherein training of the regional prediction model includes:
inputting the sample time-series features of the sample hexagonal area and the other sample hexagonal areas adjacent to the sample hexagonal area into seven preliminary regional models to output the sample time-series feature vectors;
inputting the sample time-series feature vectors into a preliminary air quality determination model to output an air pollution situation in the sample target area; and
performing verification on the air pollution situation in the sample target area output by the preliminary air quality determination model based on the label.

8. The method according to claim 1, wherein the pollution source identification model is obtained through a joint training of the image feature extraction layer and the judgment layer based on training sample data and labels, wherein the training sample data at least includes historical image data and historical air quality data, and the labels indicate pollution source categories.

9. The method according to claim 4, wherein the preferential information is used to divert road traffic flow in the target area and alleviate air pollution caused by vehicle exhaust emissions to the target area.

10. The method according to claim 3, wherein the vehicle pollution data includes vehicle exhaust emission scale, vehicle exhaust emission components, and vehicle exhaust emission distribution, and the vehicle pollution model is a Deep Neural Network model.

11. A system for area management in a smart city based on an Internet of Things, comprising a user platform, a service platform, a management platform, a sensor network platform, and an object platform, which are connected in sequence, wherein the user platform includes a terminal device, the service platform includes a first server, the management platform includes a second server, the sensor network platform includes a communication network and a gateway, the object platform includes a weather satellite, an air quality detection device, and a land satellite, wherein
the sensor network platform is configured to obtain environmental monitoring data in a target area based on the object platform and upload the environmental monitoring data to the management platform wherein the environmental monitoring data includes at least one air quality data, weather data, and satellite image data;
the management platform is configured to:
obtain deviation data between the air pollution situation and an actual air pollution situation based on the object platform;
determine a suspicious area based on the deviation data, wherein the suspicious area is an area that includes additional pollution sources;
obtain image data of the suspicious area based on the object platform; and
process the image data of the suspicious area by a pollution source identification model to determine pollution source and send the pollution source to the user platform through the service platform, wherein the pollution source identification model includes an image feature extraction layer and a judgment layer, the image feature extraction layer is used to extract an image feature vector of the suspicious area based on the image data of the suspicious area, and the judgment layer is used to determine the pollution source based on the image feature vector of the suspicious area and an air quality feature;
the management platform is further configured to predict an air pollution situation in the target area through a regional prediction model based on the environmental monitoring data, wherein the regional prediction model is Neural Network model; and
the service platform is configured to send prompt information, which is determined based on the air pollution situation in the target area, to the user platform for prompting a vehicle owner to detour or change a driving route, wherein
the target area is a hexagonal area, and an input of the regional prediction model includes features of the hexagonal area and other hexagonal areas adjacent to the hexagonal area; the features include time-series features of the hexagonal area and the other hexagonal areas, and the time-series features include a time feature, a traffic feature, and a meteorological feature;
a prediction mode of the regional prediction model is an iterative prediction, and the iterative prediction includes:
iteratively predicting air pollution situation in the hexagonal area and the other hexagonal areas adjacent to the hexagonal area at a second time point through the regional prediction model based on air pollution situation in the hexagonal area and the other hexagonal areas adjacent to the hexagonal area at a first time point; and
the regional prediction model is obtained by joint training based on training data and a label, wherein the training data includes sample time-series features of a sample hexagonal area and other sample hexagonal areas adjacent to the sample hexagonal area and sample time-series feature vectors, and the label is an actual air quality in a sample target area.

12. The system according to claim 11, wherein the sensor network platform is composed of at least one sensor sub-platform, and the sensor network platform is configured to:
respectively obtain sensing data collected by different types of sensor devices configured on the object platform through the at least one sensor sub-platform, wherein the sensing data is used as one of components of the environmental monitoring data; and
upload the sensing data to the management platform after summarizing and processing.

13. The system according to claim 11, wherein the input of the regional prediction model further includes vehicle pollution data, the vehicle pollution data is obtained by the management platform, and the management platform is further configured to:
obtain road situation prediction data and vehicle registration data in the hexagonal area and other hexagonal areas adjacent to the hexagonal area; and
predict the vehicle pollution data in the hexagonal area and other hexagonal areas adjacent to the hexagonal area by processing the road situation prediction data and the vehicle registration data through a vehicle pollution model.

14. A non-transitory computer-readable storage medium storing computer instructions, wherein when reading the computer instructions in the storage medium, a computer implements the method of claim 1.

* * * * *